United States Patent
Kawamura et al.

(10) Patent No.: US 6,638,343 B1
(45) Date of Patent: Oct. 28, 2003

(54) EXHAUST GAS TREATING DEVICE

(75) Inventors: Kohtaro Kawamura, Tokyo (JP); Rikiya Nakamura, Tokyo (JP); Kazutaka Okuda, Tokyo (JP); Keiichi Ishikawa, Tokyo (JP); Takeshi Tsuji, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/857,024

(22) PCT Filed: Nov. 29, 1999

(86) PCT No.: PCT/JP99/06631

§ 371 (c)(1), (2), (4) Date: Aug. 2, 2001

(87) PCT Pub. No.: WO00/32299

PCT Pub. Date: Jun. 8, 2000

(30) Foreign Application Priority Data

Dec. 1, 1998 (JP) ............................................. 10-342244

(51) Int. Cl.[7] .......................... B01D 47/06; B01D 47/16
(52) U.S. Cl. ............................. 95/218; 95/225; 95/228; 96/277; 96/282; 96/286; 96/306; 96/314; 96/319; 96/322; 96/355
(58) Field of Search .......................... 95/149, 218, 224, 95/225, 228; 96/243, 270, 271, 272, 273, 277, 280, 306, 275, 311, 314, 315, 316, 319, 322, 282, 286, 355

(56) References Cited

U.S. PATENT DOCUMENTS

| | | | | |
|---|---|---|---|---|
| 3,054,244 A | * | 9/1962 | Hersh | |
| 3,348,830 A | | 10/1967 | Pearl et al. | |
| 3,853,515 A | | 12/1974 | Davis | |
| 4,050,912 A | * | 9/1977 | Hemsath et al. | |
| 4,067,703 A | * | 1/1978 | Dullien et al. | |
| 4,157,249 A | | 6/1979 | Namy | |
| 4,212,654 A | * | 7/1980 | Caraway et al. | |
| 4,289,506 A | * | 9/1981 | Stone | |
| 4,594,081 A | | 6/1986 | Kroll et al. | |
| 4,801,437 A | | 1/1989 | Konagaya et al. | |
| 5,076,818 A | | 12/1991 | Jonsson | |
| 5,510,093 A | | 4/1996 | Bartz et al. | |
| 5,603,905 A | | 2/1997 | Bartz et al. | |

(List continued on next page.)

FOREIGN PATENT DOCUMENTS

| | | |
|---|---|---|
| JP | 35-848 | 2/1960 |
| JP | 49-92672 | 9/1974 |

(List continued on next page.)

OTHER PUBLICATIONS

Copending U.S. patent application Ser. No. 09/509,995, filed Apr. 5, 2000, entitled "Combustor for Waste Gas Treatment".

(List continued on next page.)

Primary Examiner—Duane S. Smith
(74) Attorney, Agent, or Firm—Wenderoth, Lind & Ponack, L.L.P.

(57) ABSTRACT

A waste gas treatment system has a primary cooling section provided at a stage subsequent to a decomposition treatment section in which a waste gas is subjected to decomposition treatment at high temperature. The primary cooling section has a liquid spray part for spraying a liquid on the treated gas from the decomposition treatment section. A secondary cooling section cools the treated gas sprayed with the liquid in the primary cooling section to reduce the volume of the treated gas. Further, a particle collecting section injects a liquid into the treated gas cooled in the secondary cooling section to collect fine particles contained in the treated gas.

28 Claims, 14 Drawing Sheets

U.S. PATENT DOCUMENTS

| | | | |
|---|---|---|---|
| 5,649,985 A | * | 7/1997 | Imamura |
| 5,846,272 A | * | 12/1998 | Natter |
| 5,902,377 A | * | 5/1999 | Morgan |
| 6,010,559 A | * | 1/2000 | Morgan |
| 6,153,150 A | * | 11/2000 | Moore et al. |
| 6,261,524 B1 | * | 7/2001 | Herman et al. |
| 6,333,010 B1 | * | 12/2001 | Holst et al. |
| 6,423,284 B1 | * | 7/2002 | Arno et al. |
| 2002/0108496 A1 | * | 8/2002 | Yeh |

FOREIGN PATENT DOCUMENTS

| | | |
|---|---|---|
| JP | 59-150519 | 8/1984 |
| JP | 61-42321 | 2/1986 |
| JP | 63-62528 | 3/1988 |
| JP | 3-52616 | 3/1991 |
| JP | 7-51534 | 2/1995 |
| JP | 8-105618 | 4/1996 |
| JP | 8-270922 | 10/1996 |
| JP | 10-61934 | 3/1998 |
| JP | 10-110926 | 4/1998 |

OTHER PUBLICATIONS

Copending U.S. patent application based on PCT/JP99/06632, Ser. No. 09/857,024, filed May 31, 2001, entitled "Waste Gas Treatment System".

Copy of International Search Report of PCT/JP99/06632.

Database WPI, Section Ch, Week 197437, Derwent Publications Ltd., London, GB; AN 1974–65684V, XP002155445, abstract of JP 49 031428.

Database WPI, Section Ch, Week 198115, Derwent Publications Ltd., London, GB; An 1981–26510D, XP002194223, abstract of JP 49 105269.

* cited by examiner

EXHAUST GAS TREATING DEVICE

TECHNICAL FIELD

The present invention relates to a waste gas treatment system for treating a waste gas that is likely to generate dust when it is treated by combustion. For example, the present invention relates to a waste gas treatment system for treating hazardous and combustible gases containing silane gas ($SiH_4$) or a halogen gas ($NF_3$, $ClF_3$, $SF_6$, $CHF_3$, $C_2F_6$, $CF_4$, etc.) discharged from semiconductor manufacturing processes or liquid crystal panel manufacturing processes, or for treating scarcely decomposable gases.

BACKGROUND ART

Waste gases that are likely to generate dust include hazardous and combustible gases, e.g., silane ($SiH_4$) and disilane ($Si_2H_6$) discharged from semiconductor manufacturing systems or liquid crystal panel manufacturing systems, and waste gases containing scarcely decomposable, global warming gases (PFCs). Such waste gases cannot be emitted into the atmosphere as they are. Therefore, the common practice is to introduce such waste gases into a pretreatment system where flames are formed in a furnace by using an auxiliary burning gas as a combustion gas, such as town (natural) gas or propane gas, and the waste gas is burned in the flames and thus made harmless by oxidation through combustion. Air is usually used as an oxidizing agent for the auxiliary burning gas.

When waste gas is treated at high temperature as stated above, fine particles (mainly $SiO_2$) are generated as a by-product. To remove the fine particles, the treated gas is passed through a scrubber (reaction tower) such as that shown in FIG. 14. The scrubber 6 has a cylindrical casing I in which a pair of packing layers 2a and 2b are disposed a predetermined distance apart from each other, and a spray device 5 having a spray nozzle 4 at the distal end of a cleaning water piping 3 is installed between the packing layers 2a and 2b. With the scrubber 6 having the described arrangement, treated gas G passing through the inside thereof remains in the space between the packing layers 2a and 2b, where fine particles are removed with cleaning water sprayed from the spray device 5.

However, fine particles contained in the treated gas G have particle diameters distributed widely over a range of from several nm to several ten μm. Although particles with large diameters can be captured, it has been difficult to remove fine particles not larger than 1 μm. Accordingly, the rate of collection of fine particles has been confined to about 60 to 70%.

The present invention was made in view of the above-described circumstances, and an object of the present invention is to provide a waste gas treatment system designed to be capable of collecting, at a high collection rate and with high efficiency, fine particles contained in treated gas resulting from subjecting a waste gas to decomposition treatment at high temperature.

SUMMARY OF INVENTION

The present invention provides a waste gas treatment system including a primary cooling section provided at a stage subsequent to a decomposition treatment section in which a waste gas is subjected to decomposition treatment at high temperature, the primary cooling section having a liquid spray part for spraying a liquid on the treated gas from the decomposition treatment section; a secondary cooling section for cooling the treated gas sprayed with the liquid in the primary cooling section to reduce the volume of the treated gas; and a particle collecting section for injecting a liquid into the treated gas cooled in the secondary cooling section to collect fine particles contained in the treated gas. The particle collecting section uses a fan scrubber having a rotary impeller. With the waste gas treatment system arranged as stated above, the treated gas is cooled in the secondary cooling section to reduce the volume thereof, and fine particles contained in the treated gas are aggregated to flocs with large particle diameters. Then, a liquid is injected into the treated gas in the particle collecting section. Therefore, the flocs are captured efficiently. In addition, the volume of the waste gas to be treated is reduced. Accordingly, it is possible to increase the rate of removal of particles from the treated gas and to discharge clean treated gas.

In addition, a U trap is detachably provided in a drain pipe line for draining water containing foreign matter such as fine particles from the primary cooling section to collect the foreign matter. Thus, not only can the waste gas and waste liquid be separated from each other, but also blockage of the drain pipe line can be prevented. There is therefore no possibility that waste liquid containing harmful substances will overflow. When foreign matter has gathered in the U trap, it is only necessary to detach the U trap from the drain pipe line and to clean the inside of the U trap. Therefore, maintenance is greatly facilitated.

In addition, a sprinkling means for sprinkling water is provided in a waste gas pipe line through which treated gas from the decomposition treatment section flows. Thus, a flow of water can always be formed on the inner wall surface of the waste gas pipe line. Therefore, even if a treated gas containing a large amount of dust flows, there is no possibility of dust adhering to the inner wall surface. Even if the waste gas G contains a corrosive gas (e.g., HF gas), waste gas piping will not be corroded. Further, because water is sprinkled, even if a high-temperature treated waste gas flows, the high-temperature treated waste gas can be cooled with a minimal amount of water.

In addition, a mist catcher is provided in a waste gas pipe line through which the treated gas from the particle collecting section flows to catch mist contained in the treated gas. Thus, it is possible to prevent mist from flowing out of the system and hence possible to prevent corrosion of piping outside the system and to suppress an increase in pressure loss due to water droplets.

In addition, there is provided a waste gas treatment method wherein a waste gas containing dust and a water-soluble hazardous gas is introduced into a fan scrubber having a rotary impeller in which the dust and the water-soluble hazardous gas are adsorbed on cleaning water droplets to purify the waste gas, wherein the rotary impeller is rotated at high speed, i.e., not less than 55 m/s in peripheral velocity, and the amount of cleaning water used is maximized to promote mixing of water droplets and the waste gas in the casing of the fan scrubber, whereby the dust and the water-soluble hazardous gas are adsorbed on the cleaning water droplets and thus removed.

In addition, there is provided a waste gas treatment method wherein a waste gas containing hydrophobic dust and a hard-to-dissolve gas is introduced into a fan scrubber having a rotary impeller in which the hydrophobic dust and the hard-to-dissolve gas are adsorbed on cleaning water droplets and thus removed to purify the waste gas, wherein the rotary impeller is rotated at high speed, i.e., not less than 55 m/s in peripheral velocity, and the amount of cleaning water used is maximized to reduce the size of water droplets in the casing of the fan scrubber and to increase the density of the water droplets, thereby increasing the probability that dust particles not larger than 1 μm, in which random motion such as the Brownian motion is dominant, will plunge directly into cleaning water droplets, and also increasing the area of contact between the hard-to-dissolve gas and cleaning water droplets, whereby the hydrophobic dust and the hard-to-dissolve gas are removed to purify the waste gas.

In addition, there is provided a waste gas treatment system wherein a waste gas containing dust and a water-soluble hazardous gas is introduced into a fan scrubber having a rotary impeller with a multiplicity of blades in which the dust and the water-soluble hazardous gas are adsorbed on cleaning water droplets to purify the waste gas, wherein the rotary impeller has a multiplicity of short blades on an outer peripheral portion thereof. Thus, it is possible to rotate the impeller at high speed without extra resistance and to increase the amount of cleaning water. Consequently, it becomes possible to reduce the size of cleaning water droplets in the casing and to increase the density of the water droplets and hence possible to remove dust and water-soluble hazardous gas from the waste gas with high efficiency.

In the above-described waste gas treatment system, the rotary impeller of the fan scrubber is provided with a multiplicity of minute holes in each blade. With this arrangement, it is possible to rotate the impeller at high speed without extra resistance and to increase the amount of cleaning water. In addition, minute droplets of cleaning water can be emitted through the minute holes of the blades. Consequently, it becomes possible to reduce the size of cleaning water droplets in the casing and to increase the density of the water droplets and hence possible to remove dust and water-soluble hazardous gas from the waste gas with high efficiency.

The rotary impeller may have a multiplicity of short blades on an outer peripheral portion thereof and further have a multiplicity of short blades and/or a multiplicity of obstacles on an inner peripheral portion thereof. With this arrangement, it is possible to remove dust and water-soluble hazardous gas from the waste gas with high efficiency as in the case of the above.

BEST MODE FOR CARRYING OUT THE INVENTION

Figure 1:
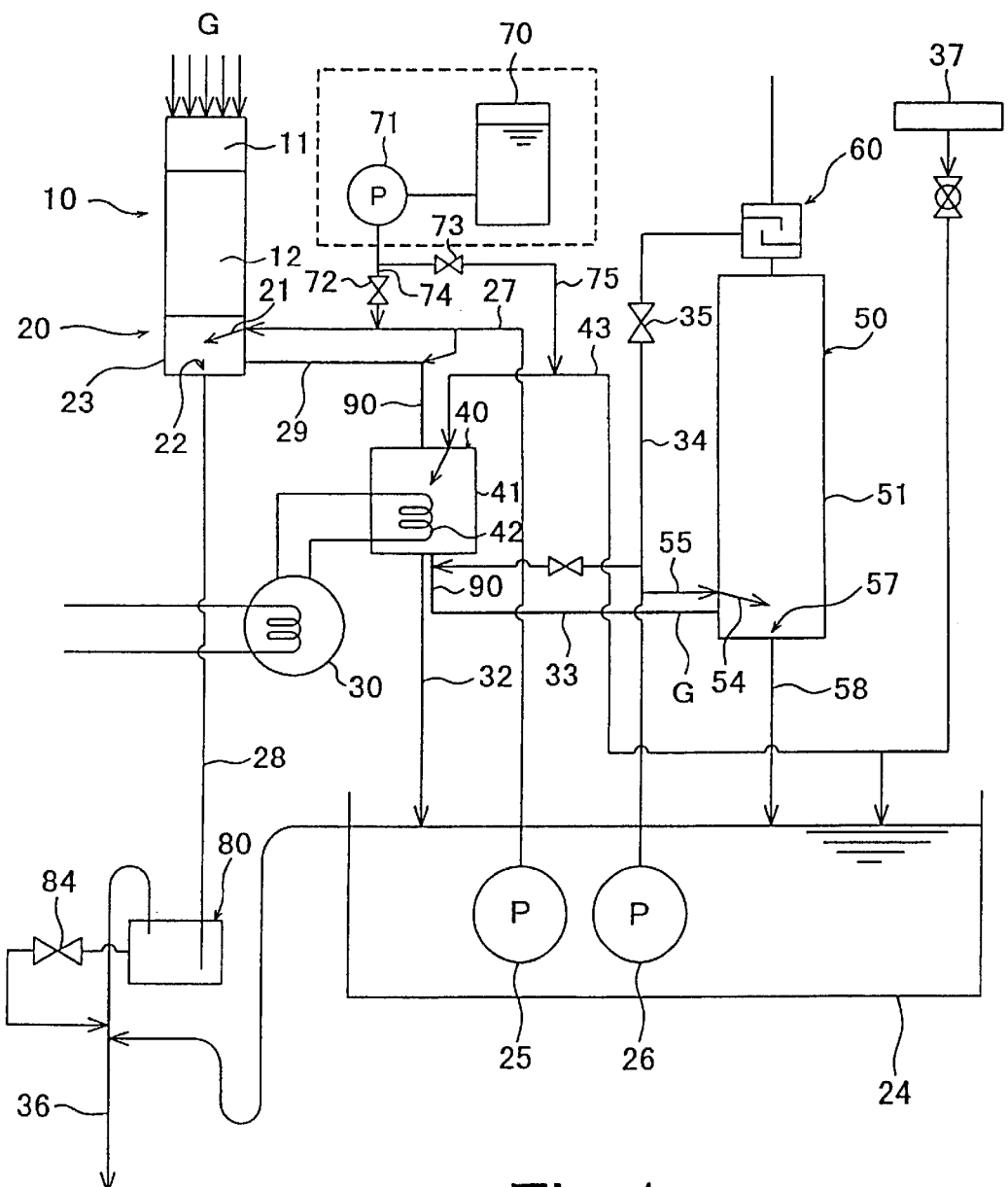
FIG. 1 is a diagram showing the whole arrangement of a waste gas treatment system according to an embodiment of the present invention.

An embodiment of the present invention will be described below with reference to FIGS. 1 to 7. FIG. 1 shows an example of the whole arrangement of a waste gas treatment system according to an embodiment of the present invention. This treatment system has a waste gas combustor 10 for combustion-treating a waste gas at high temperature as an example of a decomposition treatment section. Herein, the term "decomposition treatment" means that a waste gas is heated to give energy thereto so that the waste gas becomes readily decomposable, and air or oxygen is added to the waste gas to oxidize and decompose it. Methods of heating the waste gas include a heater method and a combustion method. With the heater heating method, the waste gas is heated to about 900° C. With the combustion method, the waste gas is burned to heat it to 1300° C. or more. The combustion method imparts a larger amount of heat energy to the waste gas than the heater heating method and is suitable for treating a large amount of waste gas.

The waste gas combustor 10 has a burner part 11 and a combustion reaction part (combustion chamber) 12 for oxidatively decomposing waste gas under heating at a stage subsequent to the burner part 11. Waste gas G is passed through flames formed by the burner part 11, whereby the waste gas is mixed with the flames and burned. In this embodiment, a burner of the type in which nozzles are opened to supply an auxiliary burning gas and/or air into a cylindrical space (flame stabilizing portion) as a swirling flow is preferably used as the burner part 11. However, it is also possible to use other appropriate types of burners, as a matter of course. Regarding decomposition treatment, it is also possible to use a heater to decompose the waste gas.

The lower end of the waste gas combustor 10 is integrally connected with a liquid spray part 20 for spraying a liquid (mainly water) on the treated gas, which has been subjected to decomposition treatment in the waste gas combustor 10. The liquid spray part 20 has a housing 23 having a nozzle hole 21 in a side thereof. The housing 23 further has a drain outlet 22 in the bottom thereof. The nozzle hole 21 is connected to liquid supply piping 27 extending from a water-supply pump 25 installed in a circulating water tank 24. The drain outlet 22 is connected to a drain pipe 28.

Figure 2:
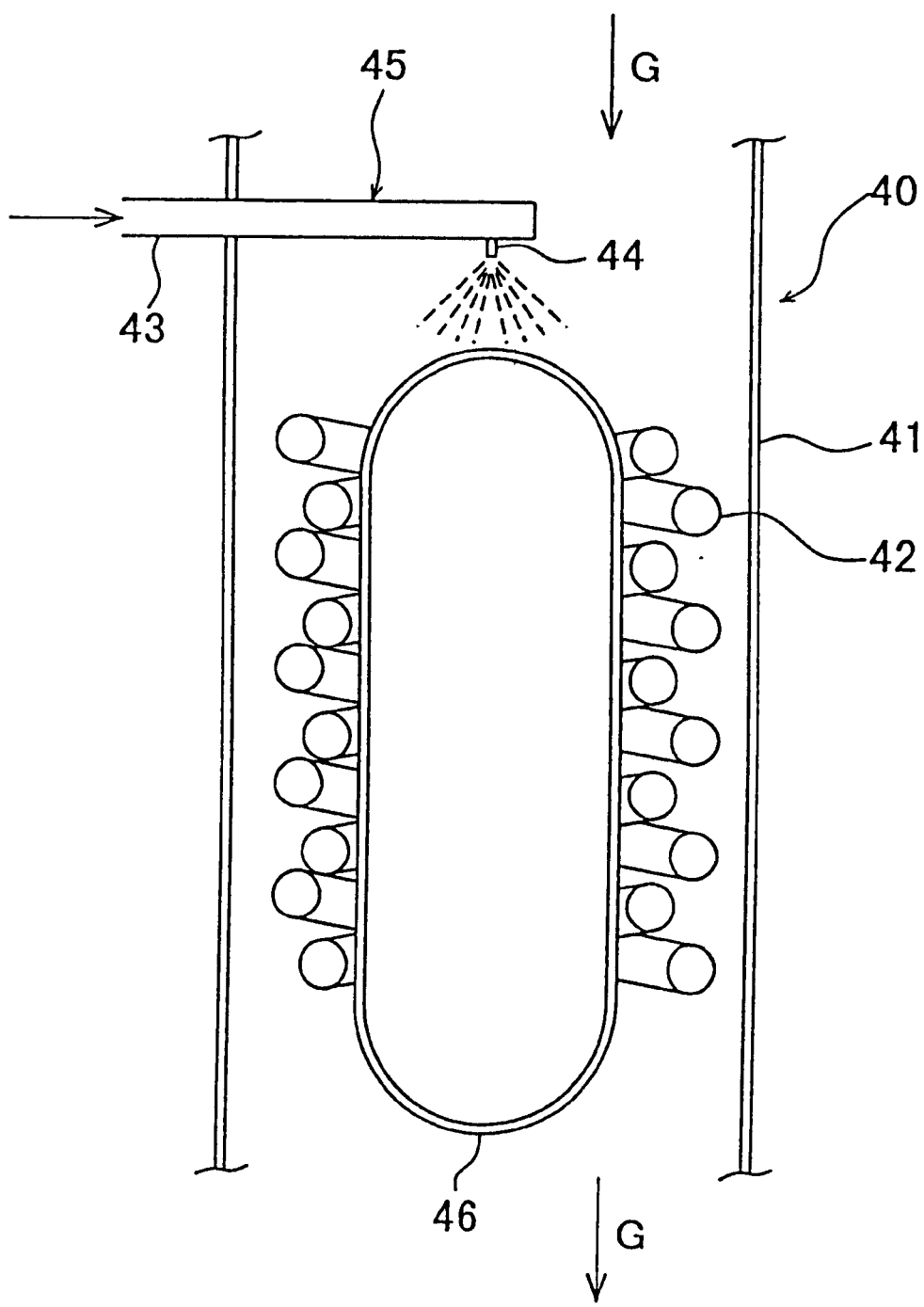
FIG. 2 is a vertical sectional view showing a structural example of an evaporator used in the waste gas treatment system shown in FIG. 1.

Waste gas piping 29 is connected to a side of the housing 23 of the liquid spray part 20 to discharge gas from the waste gas combustor 10. The waste gas piping 29 is connected to the upper end of a cooler 40 cooled by a refrigerator 30. The cooler 40 has a closed cylindrical casing 41 in which a central portion in the heightwise direction is formed from a double tube. As shown in FIG. 2, a coiled finned tube 42 is disposed in the casing 41. A refrigerant cooled in the refrigerator 30 flows through the tube 42. A spray nozzle 45 is provided above the finned tube 42. The spray nozzle 45 has a nozzle hole 44 opened in the distal end of cleaning water piping 43. The cooler 40 constitutes an evaporator in which the refrigerant evaporates in the finned tube 42 by absorbing latent heat from the surrounding gas. In addition, an obstacle 46 is provided to allow the waste gas and the finned tube 42 to exchange heat efficiently. Thus, the efficiency of contact between the waste gas and the finned tube 42 is increased.

The bottom of the casing 41 of the cooler 40 is connected with cooling water piping 32 for returning cleaning water from the nozzle to the circulating water tank 24 and gas piping 33 for sending the waste gas cooled in the cooler 40 to a fan scrubber 50.

Figure 3:
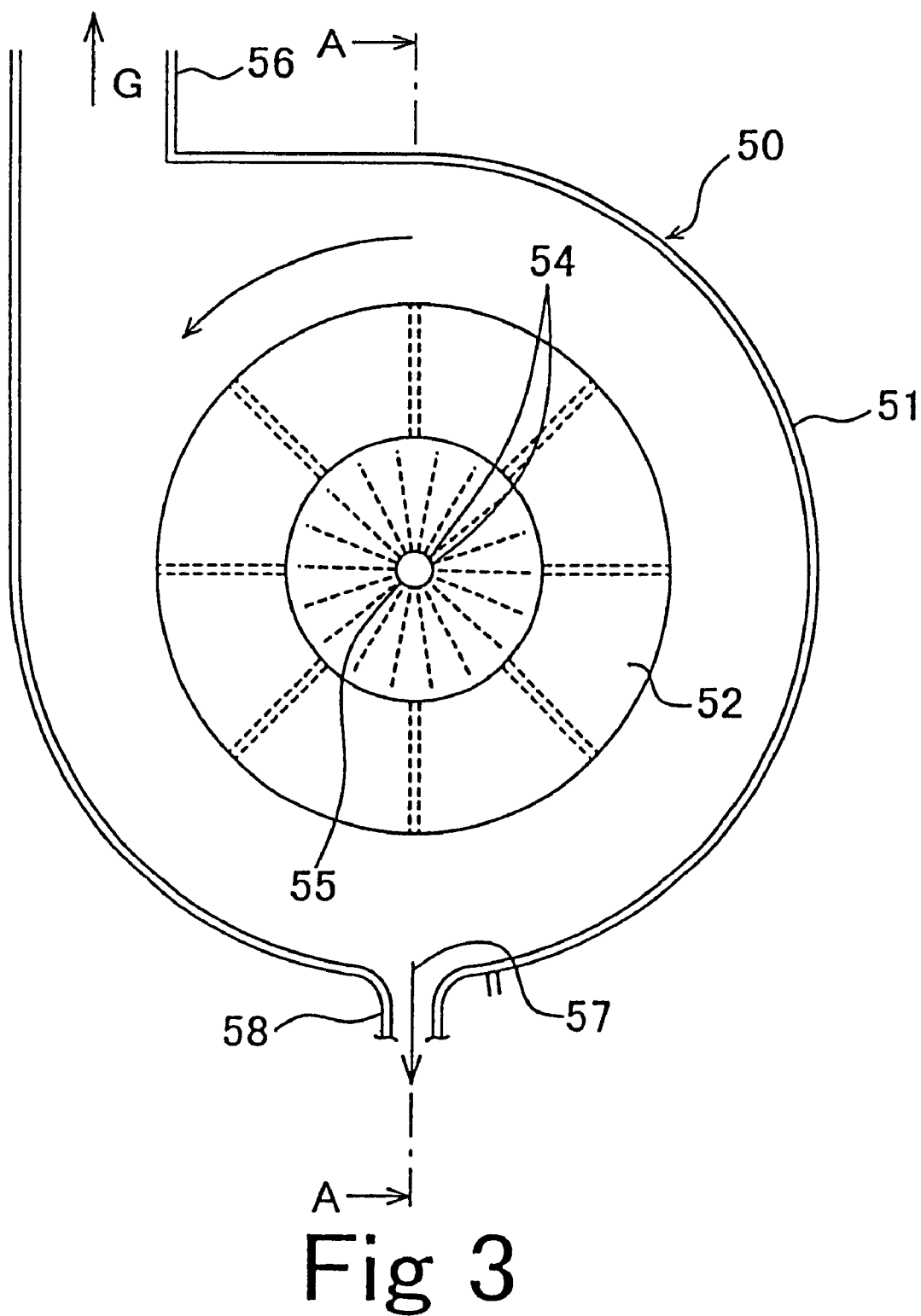
FIG. 3 is a vertical sectional front view showing a structural example of a fan scrubber used in the waste gas treatment system shown in FIG. 1.
Figure 4:
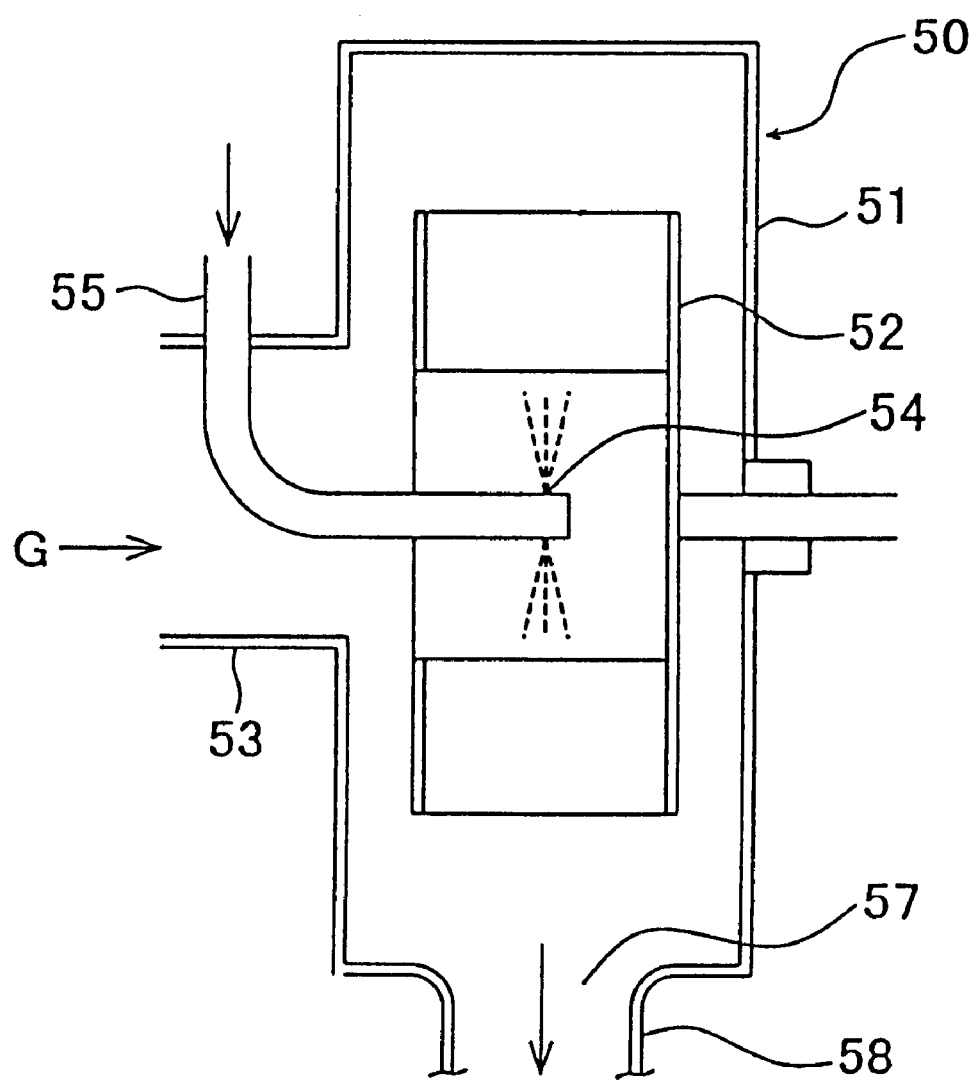
FIG. 4 is a sectional view taken along the line A—A in FIG. 3.

As shown in FIGS. 3 and 4, the fan scrubber 50 has a casing 51 installed in a vertical position. An impeller 52 is disposed in the casing 51 to rotate in a vertical plane by the operation of a motor (not shown). An inlet 53 is opened in the center of one side of the casing 51. The gas piping 33 is connected to the inlet 53. In addition, water supply piping 55 is inserted into the casing 51. The water supply piping 55 has spray nozzle openings 54 for spraying cleaning water radially from the center of the impeller 52. Meanwhile, the outer peripheral surface of the casing 51 is provided with a waste gas outlet 56 in the top thereof and also provided with a drain outlet 57 in the bottom thereof. Further, a mist catcher 60 is connected to the top of the casing 51 to catch mist contained in the waste gas discharged from the fan scrubber 50.

Figure 5:
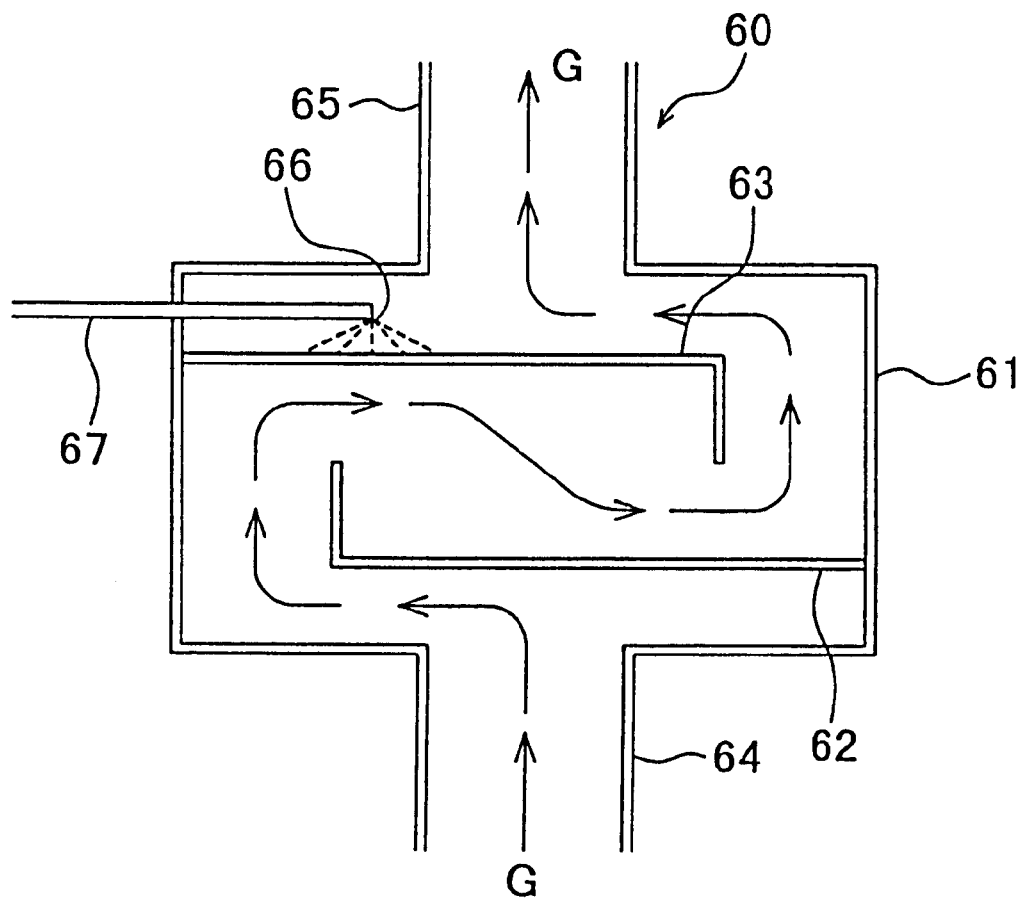
FIG. 5 is a vertical sectional view showing a structural example of a mist catcher used in the waste gas treatment system shown in FIG. 1.

As shown in FIG. 5, the mist catcher 60 has a casing 61 in which baffle plates 62 and 63 are disposed. Each of the baffle plates 62 and 63 is bent at the distal end thereof so as to have an L-shape. The casing 61 has a waste gas inlet 64 in the bottom thereof, and a waste gas outlet 65 is provided in the top of the casing 61. Further, cleaning water piping 67 is disposed above the baffle plate 63. The cleaning water piping 67 has a spray nozzle 66 for sprinkling cleaning water. The cleaning water piping 67 is connected through a valve 35 to piping 34 extending from a pump 26. The inlet 64 is connected to the waste gas outlet 56 of the fan scrubber 50. The waste gas outlet 65 is connected to an exhaust gas duct (not shown). The piping 34 extending from the pump 26 is connected to the water supply piping 55 of the fan scrubber 50. Further, the circulating water tank 24 is supplied with industrial water from an industrial water source 37. Water is drained from the circulating water tank 24 to a drain pipe 36 by a blowdown effect.

It should be noted that the system according to this embodiment is provided with an alkaline liquid tank 70 for supplying an alkaline liquid to the liquid supply piping 27 or 43 according to need. That is, a liquid-supply pump 71 is connected to the alkaline liquid tank 70, and alkaline liquid supply piping 74 and 75 extend from the liquid-supply pump 71 through respective valves 72 and 73. The alkaline liquid supply piping 74 and 75 join the liquid supply piping 27 or 43. The arrangement is such that by driving the liquid-supply pump 71, the alkaline liquid is added to the liquid sprayed from the nozzle hole 21 of the liquid spray part 20 or from the nozzle hole 44 of the cooler 40.

Figure 12:
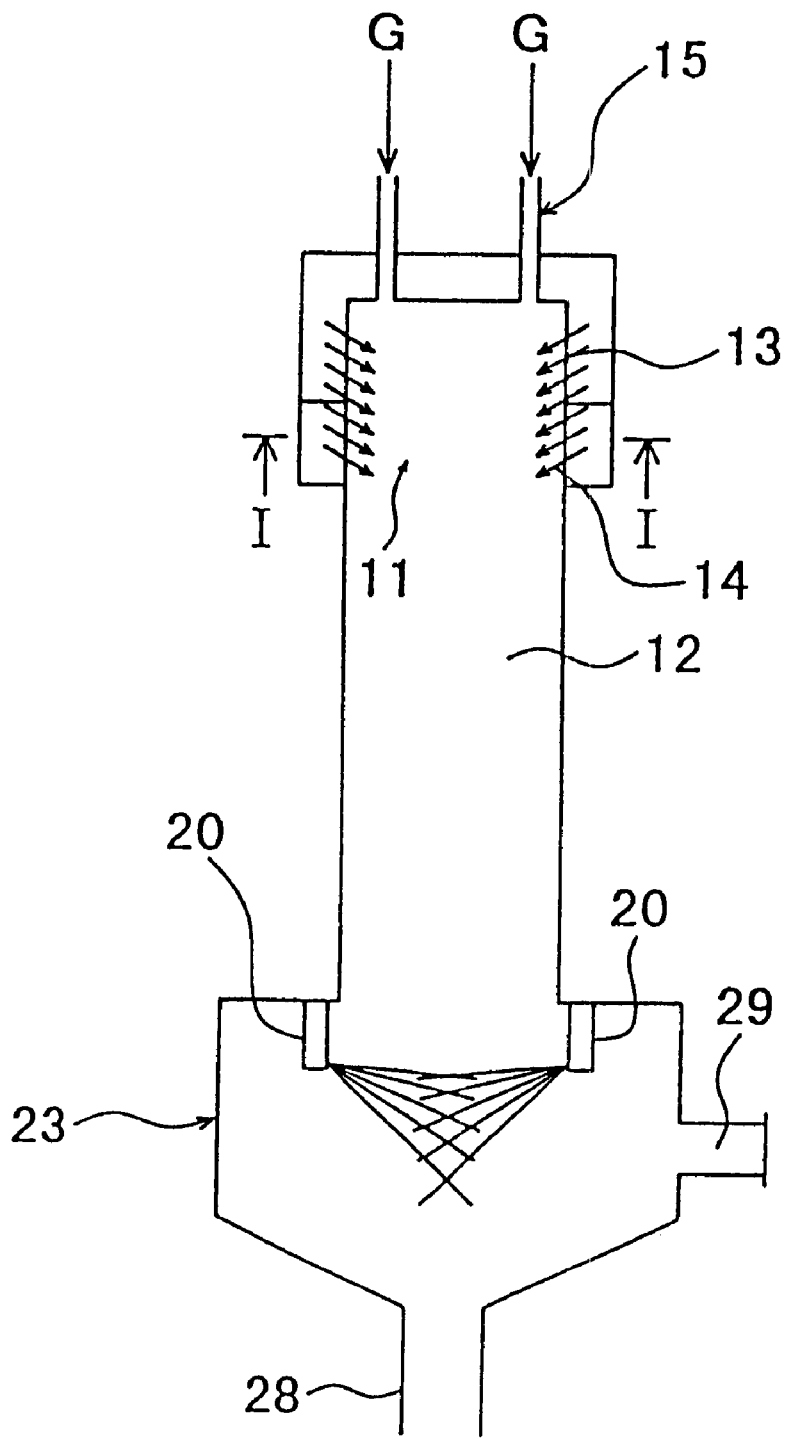
FIG. 12 is a diagram showing a structural example of a waste gas combustor and a liquid spray part used in the waste gas treatment system shown in FIG. 1.
Figure 13:
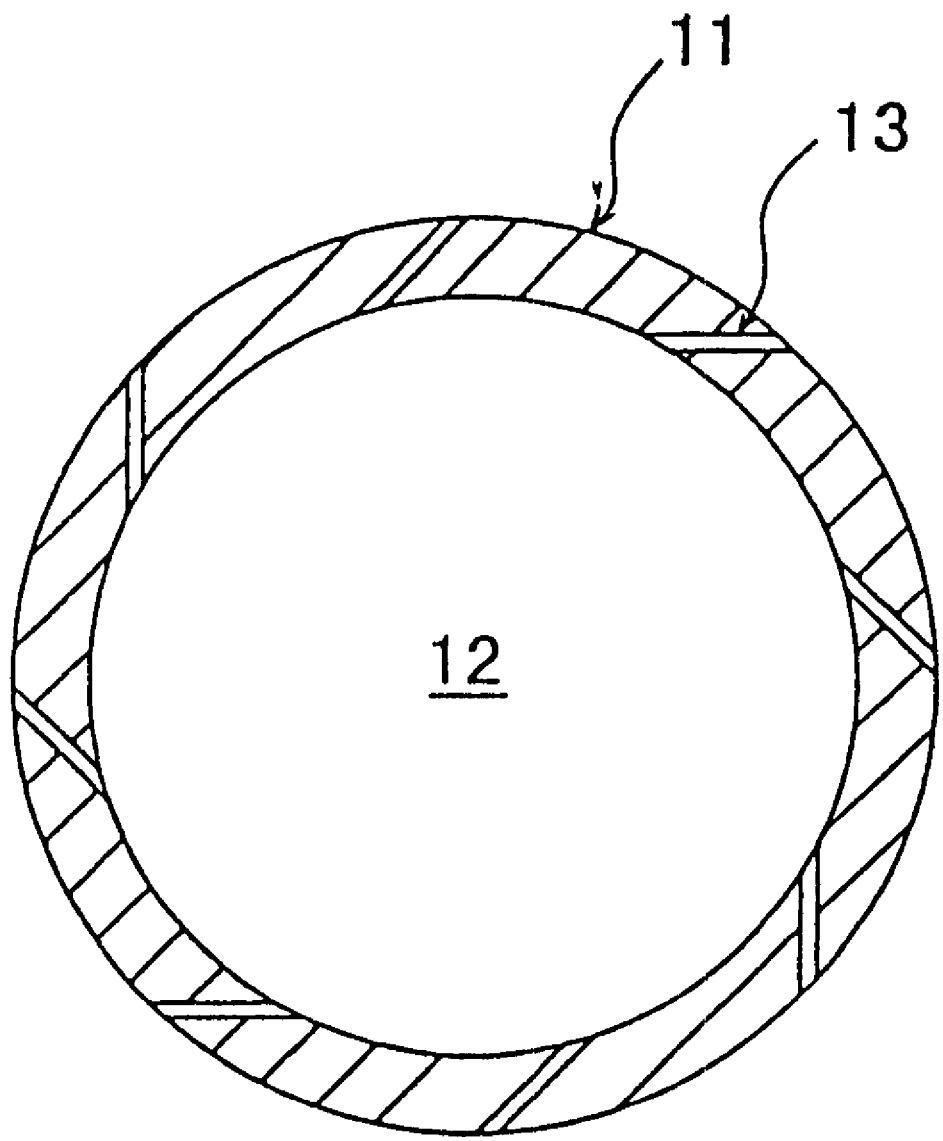
FIG. 13 is a sectional view as seen in the direction of the arrow I—I in FIG. 12.
Figure 14:
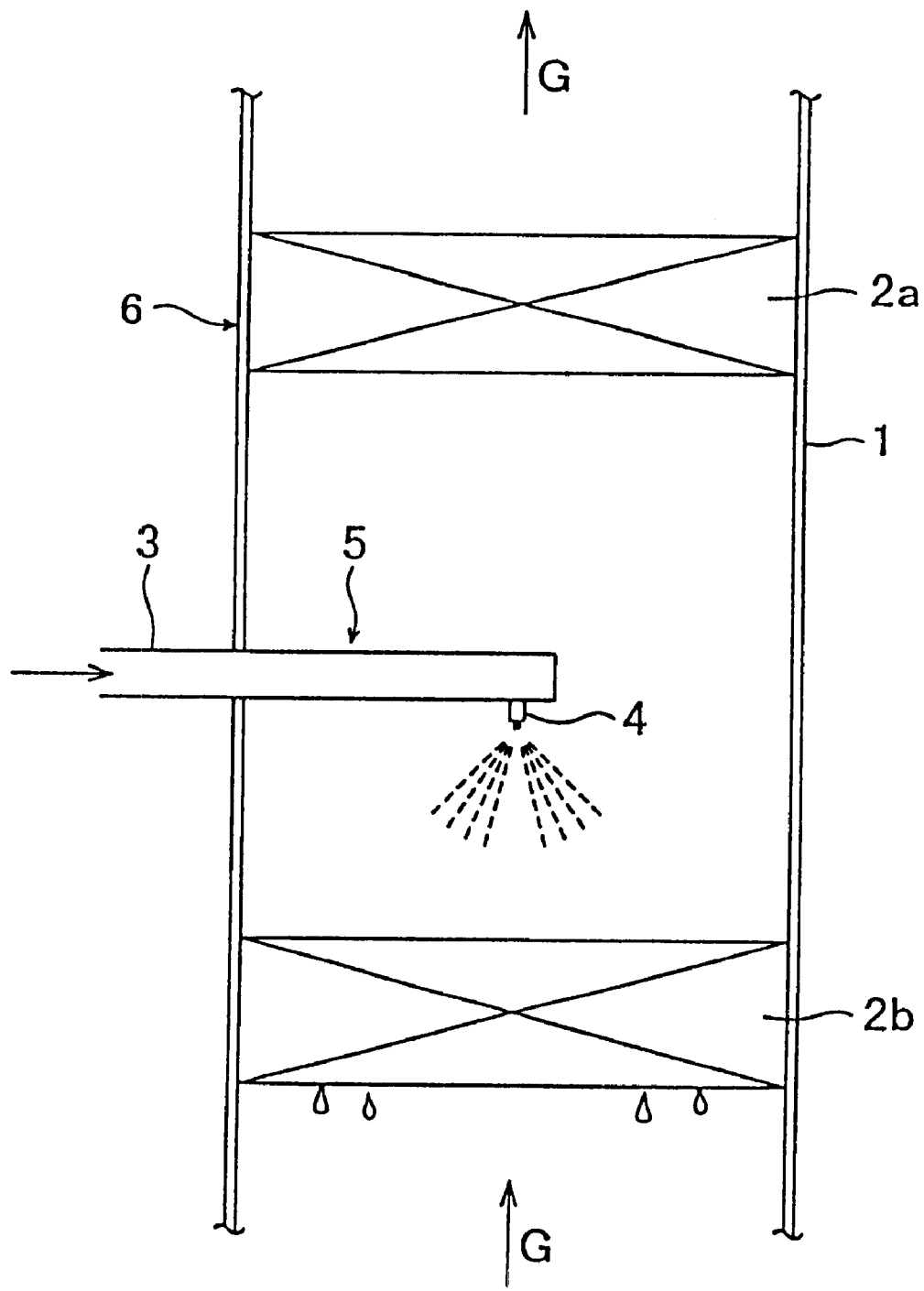
FIG. 14 is a sectional view showing a structural example of a scrubber (reaction tower) used in a conventional waste gas treatment system.

Next, the treatment of waste gas by the waste gas treatment system according to this embodiment will be described with reference to FIGS. 12 and 13. It should be noted that FIG. 12 is a diagram showing a structural example of the waste gas combustor 10 and the liquid spray part 20 shown in FIG. 1, and FIG. 13 is a sectional view as seen in the direction of the arrow I—I in FIG. 12. As illustrated in the figures, the side wall of the burner part 11 is provided with an air nozzle 13 for injecting air into the burner part 11 to form swirling air flows. The air nozzle 13 has openings provided in the inner peripheral surface thereof at equal spaces and in a plurality of stages in the vertical direction. Further, an auxiliary burning gas nozzle 14 is provided below the air nozzle 13 to blow off an auxiliary burning gas to form swirling flows of auxiliary burning gas. The auxiliary burning gas nozzle 14 has openings provided in the inner peripheral surface at equal spaces and in a plurality of stages in the vertical direction. Waste gas G to be treated is introduced into the burner part 11 through waste gas inlet pipes 15 opened on the lower surface of the top plate of the burner part 11. The waste gas G is decomposition-treated at high temperature in the combustion chamber 12 by swirling flames formed in the burner part 11. Treated gas (combustion gas) G, which has been subjected to the decomposition treatment, flows into the liquid spray part 20. In the liquid spray part 20, a liquid (mainly water) is sprayed on the treated gas. Consequently, HCl and HF in the treated gas are absorbed by the sprayed liquid and discharged to the outside through the drain pipe 28. Steam in the treated gas reaches saturation or a state close to it.

The treated gas from which HCl and HF have been removed and in which steam has reached saturation or a state close to it flows into the cooler 40. While the treated gas is flowing through the cooler 40, latent heat required for the refrigerant flowing through the finned tube 42 to evaporate is taken away from the treated gas. Thus, the treated gas is cooled rapidly. As the treated gas cools down, the volume of the treated gas contracts. Consequently, the probability that fine particles in the treated gas will collide with each other increases. Thus, in the course of passing through the cooler 40, fine particles aggregate to flocs with large particle diameters. Treated gas G containing enlarged flocs flows into the fan scrubber 50.

In the fan scrubber 50, while a liquid (mainly water) is being sprayed from the spray nozzle openings 54, the impeller 52 is rotated to suck the treated gas supplied from the inlet 53. The treated gas G is caused to flow around in the casing 51 by the centrifugal action of the impeller 52 and thus flows into the mist catcher 60 from the waste gas outlet 56.

In the mechanism for rotating the impeller 52, a motor with an inverter or a DC motor with a rotation control unit is used.

A liquid is sprayed radially from the spray nozzle openings 54 to form a curtain of mist, thereby absorbing enlarged masses of fine particles (flocs) from the treated gas G. The liquid absorbing the flocs collides against the inner peripheral surface of the casing 51. Thereafter, the liquid flows down the inner peripheral surface of the casing 51 and returns to the circulating water tank 24 from the drain 57 through piping 58.

Thus, because fine particles in the treated gas are aggregated to flocs with large particle diameters, it becomes easy to capture them by spraying water or mist. Further, because the volume of the gas to be treated is reduced, fine particles in the treated gas can be collected efficiently at an increased rate of collection. An experiment carried out by the inventors of the present application has confirmed that the rate of collection of fine particles from the treated gas can be increased to 90% or more.

The treated gas G flowing into the mist catcher 60 is caused to change its direction of flow by the baffle plates 62 and 63 as shown by the arrows in FIG. 5. As the direction of flow of the treated gas G is changed, the mist in the treated gas G cannot effectively change its flow and collides against the baffle plates 62 and 63. Thus, the mist in the treated gas G is caught.

By providing the mist catcher 60 downstream the fan scrubber 50 as stated above, the mist can be prevented from flowing out of the system. Thus, it is possible to prevent corrosion of piping outside the system and to suppress an increase in pressure loss caused by blockage of piping with water droplets.

Figure 6:
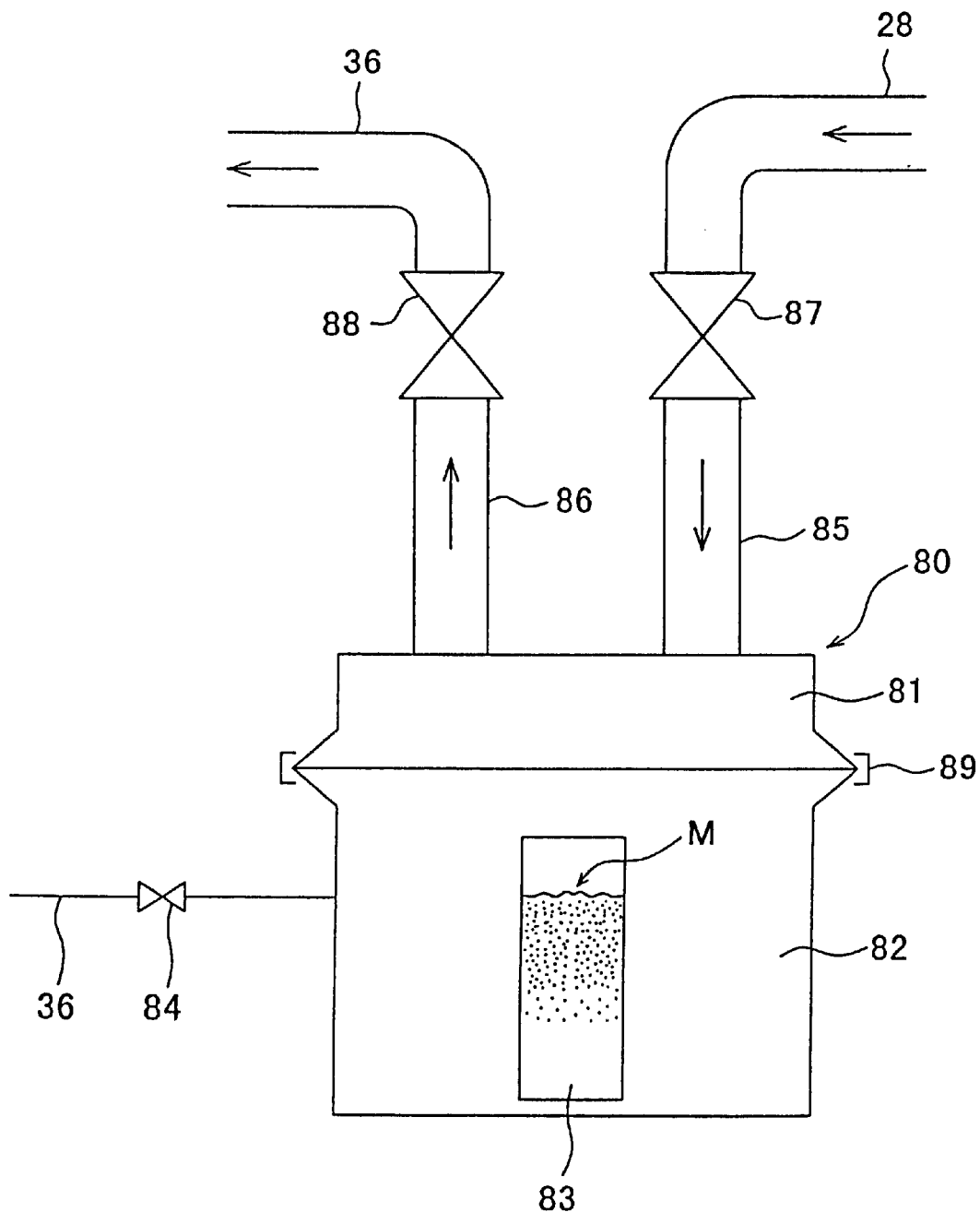
FIG. 6 is a diagram showing the arrangement of a pot-type U trap used in the waste gas treatment system shown in FIG. 1.

The drain pipe 28 connected to the drain outlet 22 of the housing 23, which is provided at the lower end of the waste gas combustor 10, is provided with a pot-type U trap 80 for preventing blocking of piping for passing drain containing foreign matter such as dust. As shown in FIG. 6, the pot-type U trap 80 comprises a lid 81 and a pot 82. The lid 81 and the pot 82 are connected to each other by a clamp 89. The lid 81 is provided with a drain inlet 85 and a drain outlet 86. The drain inlet 85 is connected with the drain pipe 28 through a ball valve 87. The drain outlet 86 is connected with the drain pipe 36 through a ball valve 88. A side of the pot 82 is provided with an observation port 83 for checking the amount of foreign matter such as dust collected in the pot 82. It is also possible to provide a sensor comprising a photoelectric sensor or the like for detecting that a predetermined amount of foreign matter has been collected, although illustration thereof is omitted.

In the pot-type U trap 80 arranged as stated above, drain containing foreign matter such as dust from the housing 23 flows into the pot 82 through the ball valve 87 and the drain inlet 85 and is drained from the pot 82 to the drain pipe 36 through the drain outlet 86 and the ball valve 88. Although in FIG. 6 the inlet-side drain pipe 28 is higher than the outlet-side drain pipe 36, the drain pipe 28 and the drain pipe 36 may be at the same height.

Foreign matter M such as dust heavier in specific gravity than water remains in the pot 82, and only water is drained through the drain pipe 36. The foreign matter M such as dust collected in the pot 82 can be checked as to whether or not a predetermined amount of foreign matter has been collected from the observation port 83 or by the output of a sensor for detecting the foreign matter if it is provided. Therefore, when the amount of foreign matter has reached a predetermined value, the ball valves 87 and 88 are closed, and a drain valve 84 is opened to drain water from the pot 82. Thereafter, the clamp 89 is removed, and the foreign matter is removed from the pot 82. After the inside of the pot 82 has been cleaned, the pot 82 is joined to the lid 81 through the clamp 89. Then, the ball valves 87 and 88 are opened. Thus, drain from the housing 23 can be discharged through the pot-type U trap 80 as in the case of the above. In a case where the above-described sensor is provided, a control system may be arranged so that the drain valve 84 can be opened or closed according to the output of the sensor. That is, the control system may be arranged such that when the sensor detects that a predetermined amount of foreign matter has been collected in the pot 82, the drain valve 84 is opened, thereby allowing drainage and cleaning to be carried out automatically.

Thus, provision of the pot-type U trap 80 in the drain pipe 28 allows foreign matter M such as dust to gather in the pot 82 and makes it possible to prevent blockage of the drain pipe 36 and the following piping with foreign matter. Further, because the pot 82 is joined to the lid 81 simply with the clamp 89, when foreign matter has gathered in the pot 82, the pot 82 can be readily removed from the lid 81 to clean the inside thereof.

Further, because the pot 82 is provided with the observation port 83, it is easy to make a check as to whether or not foreign matter M has gathered in the pot 82. Further, because the drain valve 84 for draining water from the pot 82 is provided, the pot 82 can be removed without overflowing of water containing harmful substances by draining water before the removal of the pot 82.

The drain valve 84 is provided within a range where the observation port 83 provided in the side wall of the pot 82 is visible, and immediately before foreign matter M gathers up to the height of the drain valve 84, the pot 82 is removed and cleaned, whereby the pot 82 can be cleaned without clogging the drain valve 84.

Further, because the drain pipes 28 and 36 are connected to the drain inlet 85 and the drain outlet 86 of the pot-type U trap 80 through the respective ball valves 87 and 88, the pot 82 can be cleaned without letting the upstream- and downstream-side atmospheres be released to the atmospheric air when the pot 82 is removed.

Figure 7:
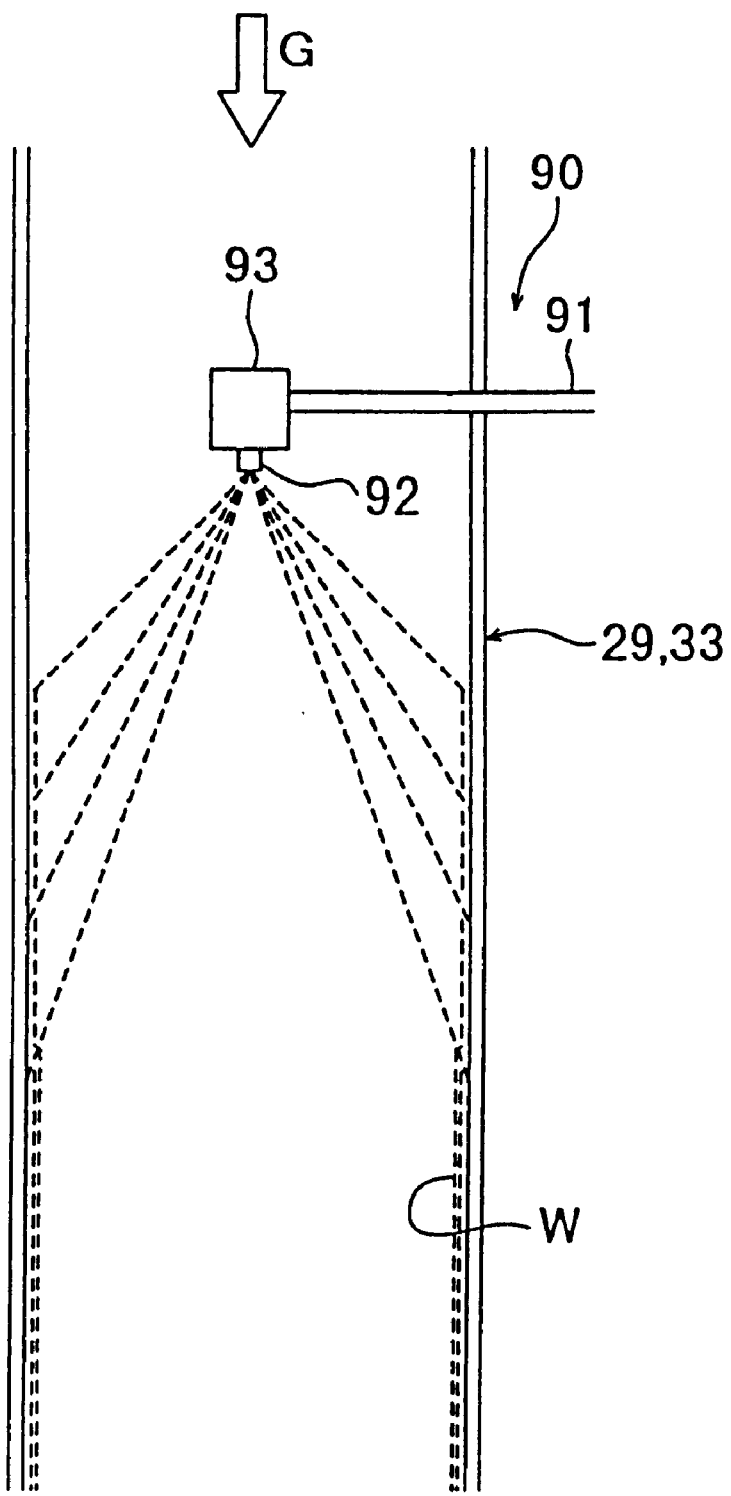
FIG. 7 is a vertical sectional view showing a structural example of a piping spray used in the waste gas treatment system shown in FIG. 1.

A piping spray 90 is provided in a vertical piping portion of each of the waste gas piping 29 and 33. As shown in FIG. 7, the piping spray 90 comprises a spray nozzle 93 provided in a vertical piping portion of each of the waste gas piping 29 and 33. The spray nozzle 93 has a nozzle hole 92 opened at the distal end of cleaning water piping 91. The cleaning water piping 91 is connected to the liquid supply piping 27 and the piping 34 and supplied with water.

In the piping spray 90 arranged as stated above, water is always sprinkled from the spray nozzle 93 at a flow rate, for example, of 1 l/min. Consequently, water W flows down the inner wall surfaces of the waste gas piping 29 and 33, i.e., a water stream layer is formed on the inner wall surfaces. Therefore, even if treated waste gas G containing a large amount of dust flows, there is no possibility of dust adhering to the inner wall surfaces. Further, because water flows down the inner wall surfaces of the waste gas piping 29 and 33 by being sprinkled at all times, the waste gas piping is not corroded even if the treated waste gas G contains a corrosive gas (e.g., HF gas). Further, because water is sprinkled therein, the waste gas piping 29 and 33 are filled with water droplets. Accordingly, even if high-temperature treated waste gas G flows in, because the treated waste gas G contacts the water droplets for a long period of time, the high-temperature treated waste gas G can be cooled with a minimal amount of water. In addition, the cooling efficiency in the cooler 40 can also be increased. Even if treated gas G is arranged to flow opposite to the flow of water sprayed from the nozzle hole 92 of the spray nozzle 93 (i.e., upward from the bottom as viewed in the figure), the same effect can be obtained, as a matter of course.

In a case where the piping spray 90 is not provided in the vertical portion of each of the waste gas piping 29 and 33 as stated above, it is necessary to perform maintenance on the waste gas piping 29 and 33 once a month. However, by installing the piping spray 90 having the above-described arrangement, it becomes necessary to perform maintenance only once every 6 months. It should be noted that the piping spray is, basically, used in a vertical portion of piping, that is, in vertical piping. However, where the piping spray is installed is not limited thereto; it is also usable in obliquely inclined piping or horizontally installed piping. In such a case, the same effect can also be obtained.

In the waste gas treatment system arranged as stated above, the flow velocity at which waste gas G1 is introduced into the burner part 11 of the waste gas combustor 10 is made higher than the hydrogen flame propagation velocity (2.5 to 2.8 n/s) in the atmospheric air by reducing the bore diameter of the waste gas inlet pipe, thereby preventing the occurrence of backfire into the waste gas inlet piping. A pressure loss due to the flow velocity control effected by reducing the bore diameter of the waste gas inlet pipe is canceled by keeping the inside of the system at a negative pressure at all times through the fan scrubber 50.

Further, keeping the inside of the system at a negative pressure at all times through the fan scrubber 50 makes it possible to effectively reduce the load on a vacuum pump at the stage preceding the waste gas treatment system and also makes it possible to prevent waste gas from leaking to the outside if there is a pinhole or the like in piping extending between the vacuum pump and the waste gas treatment system or in a gas contact portion in the waste gas treatment system.

Further, by-product collecting performance at a primary cooling section comprising the liquid spray part 20, which is provided at the stage subsequent to the waste gas combustor 10, is confined to rough collection of high-concentration acid gases and fine particles. The liquid (mainly water) used in the liquid spray part 20 is not returned to the circulating path in the system but drained to the outside of the system as primary cooler drain, thereby reducing the amount of water drained from the circulating water tank 24 by a blowdown effect.

Further, the cooler 40, which is temperature-controlled by the refrigerator 30, is provided as a secondary cooling section at a stage subsequent to the primary cooling section. Thus, when treated waste gas G is passed through the cooler 40, heat exchange with the refrigerant is performed, whereby the particle diameter of fine particles can be increased by the condensation of gas, and the treated waste gas G can be cooled. Furthermore, water is sprayed from the spray nozzle 45 in the cooler 40, thereby collecting and removing acid gases remaining in trace amounts and reducing the temperature of sprayed water at the same time. Thus, it is possible to solve the problem of a rise in temperature of circulating water in the waste gas treatment system and hence possible to reduce the amount of blowdown water from the circulating water tank 24. As a result, the amount of cooling and cleaning water used in the system can be reduced by a considerable extent.

Further, the waste gas treatment system employs the fan scrubber 50 having the impeller 52 therein to perform contact mixing of treated waste gas and cleaning water, thereby increasing the gas-liquid contact efficiency and achieving a reduction in size of the system as well as reducing the amount of water used. Further, because the particle diameter of fine $SiO_2$ particles is increased in the secondary cooling section, particle removal by dust collection is further facilitated.

Figure 8:
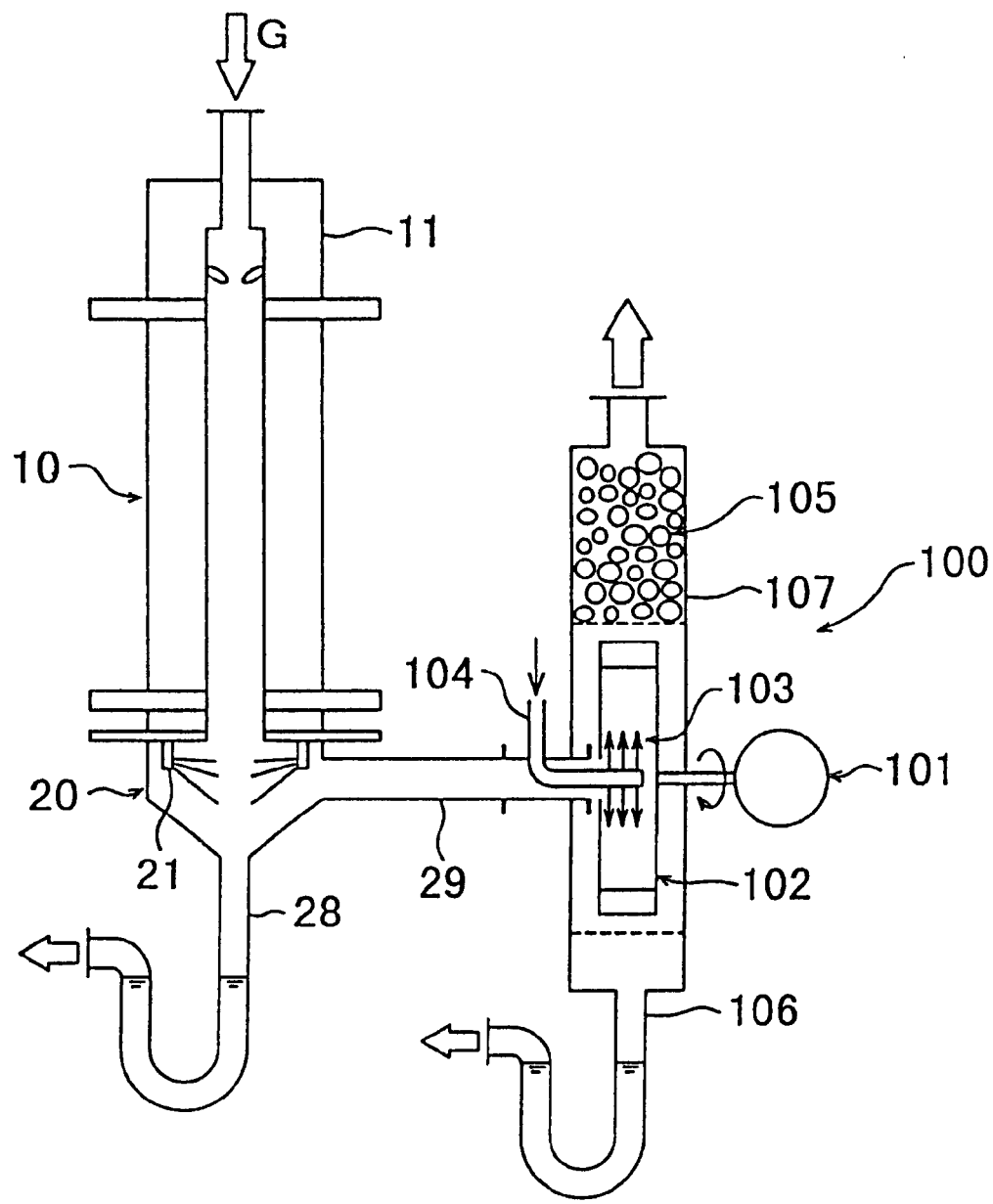
FIG. 8 is a diagram showing a structural example of a waste gas treatment system according to the present invention.

FIG. 8 is a diagram showing a structural example of a waste gas treatment system using a fan scrubber according to the present invention. In this waste gas treatment system, as illustrated in the figure, waste gas from the liquid spray part 20 provided at the lower end of the waste gas combustor 10 is introduced directly to a fan scrubber 100. The fan scrubber 100 has an impeller 102 rotated by a motor 101 for high-speed rotation. Water supply piping 104 is disposed in the fan scrubber 100. The water supply piping 104 has a spray nozzle 103 for sprinkling cleaning water radially from the center of the impeller 102. A mist catcher 105 is installed in the upper part of the fan scrubber 100. Drain piping 106 is disposed at the lower end of the fan scrubber 100.

In the waste gas treatment system arranged as stated above, waste gas discharged from the liquid spray part 20 at the lower end of the waste gas combustor 10 contains dust, e.g., $SiO_2$, and water-soluble hazardous gases. The impeller 102 is rotated at high speed, and the amount of cleaning water blown off from the spray nozzle 103 is increased, thereby promoting mixing of cleaning water droplets and waste gas in the casing 107 of the fan scrubber 100. Consequently, dust and water-soluble hazardous gases in the waste gas are effectively adsorbed on the cleaning water droplets. Thus, the dust and hazardous gases are removed from the waste gas with high efficiency. In a waste gas containing fine hydrophobic dust particles with a particle diameter not larger than 1 $\mu$m and somewhat hard-to-dissolve gases, in particular, the motion of dust particles is such that random motion such as the Brownian motion is more dominant than unitary motion of dust as particles of a gaseous body. Therefore, by utilizing this fact, the impeller 102 is rotated at high speed, and the amount of cleaning water is increased, whereby water droplets filling the casing 107 are reduced in size and increased in density, thereby increasing the area of contact between the cleaning water and the waste gas. Thus, fine dust particles performing random motion and somewhat hard-to-dissolve gasses are readily adsorbed on cleaning water droplets.

In a case where the number of revolutions of an impeller with a diameter of 220 mm was set at 4800 rpm or more (peripheral velocity: 55 m/s or more) and the amount of cleaning water was increased such that the power of the high-speed rotation motor 101 (rating: 0.7 kw) was 90 to 100% (as the amount of cleaning water is increased, the load on the high-speed rotation motor 101 also increases owing to an increase in resistance), it was confirmed that it was possible to remove dust and somewhat hard-to-dissolve gases with high efficiency, i.e., 90% for dust particles not larger than 1 $\mu$m, and 99% for such gases. Thus, dust and hazardous gases in waste gas can be removed with high efficiency (inferior in efficiency to a filter), without a likelihood of clogging as occurs in a filter, by rotating the rotary impeller of the fan scrubber 100 at high speed and increasing the amount of cleaning water.

Figure 9:
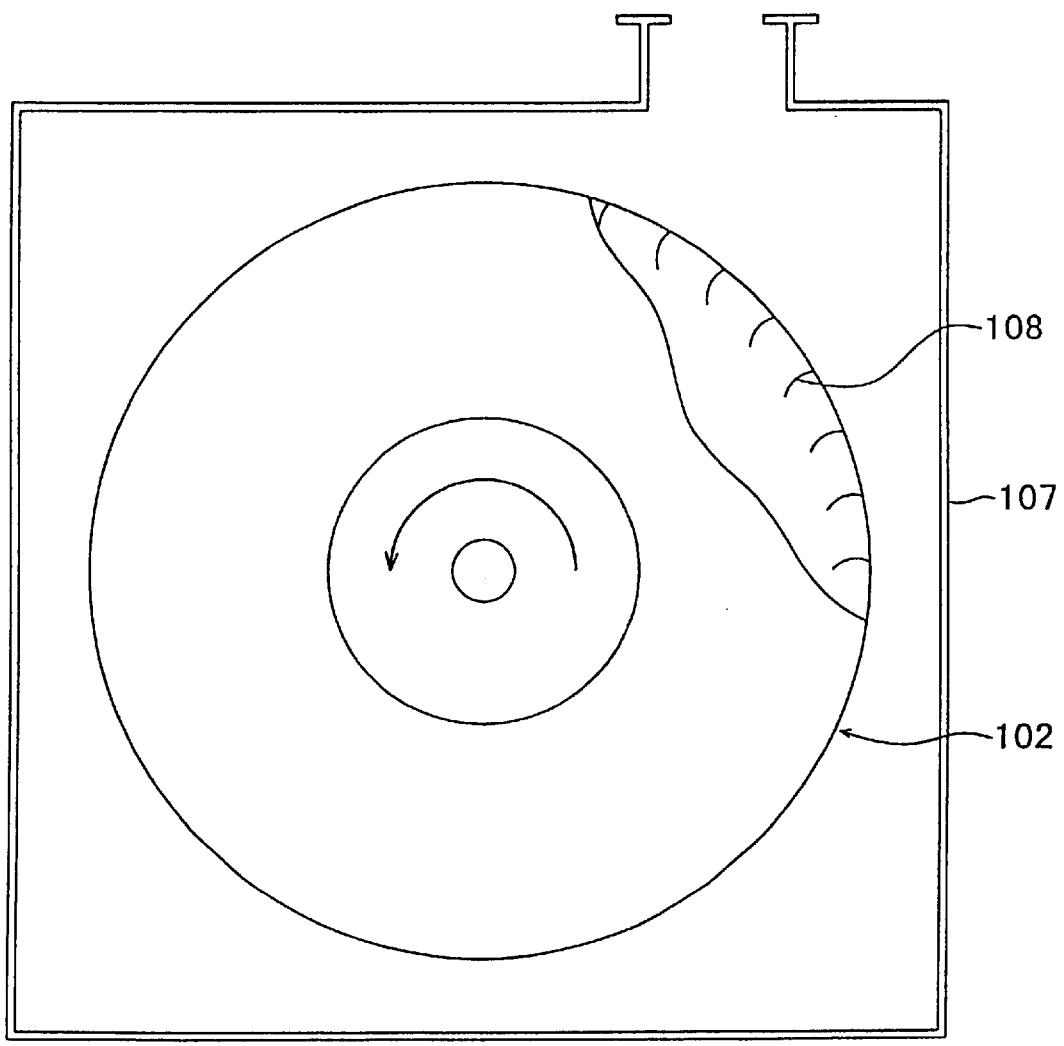
FIG. 9 is a vertical sectional view showing a structural example of a fan scrubber used in the waste gas treatment system shown in FIG. 8.

As the impeller 102, an impeller having a structure as shown in FIG. 9 is used. That is, a multiplicity of blades 108 having a short length L are provided on the outer peripheral portion where the flow velocity is high and the impact effect is large. Thus, air resistance and so forth are reduced, and extra resistance disappears. Therefore, the amount of cleaning water blown off from the spray nozzle 103 can be increased correspondingly, and the impeller 102 can be rotated at correspondingly high speed. As a result, it becomes possible to reduce the size of cleaning water droplets in the casing 107 and to increase the density of cleaning water droplets and hence possible to remove dust and water-soluble hazardous gases from waste gas with high efficiency.

Figure 10:
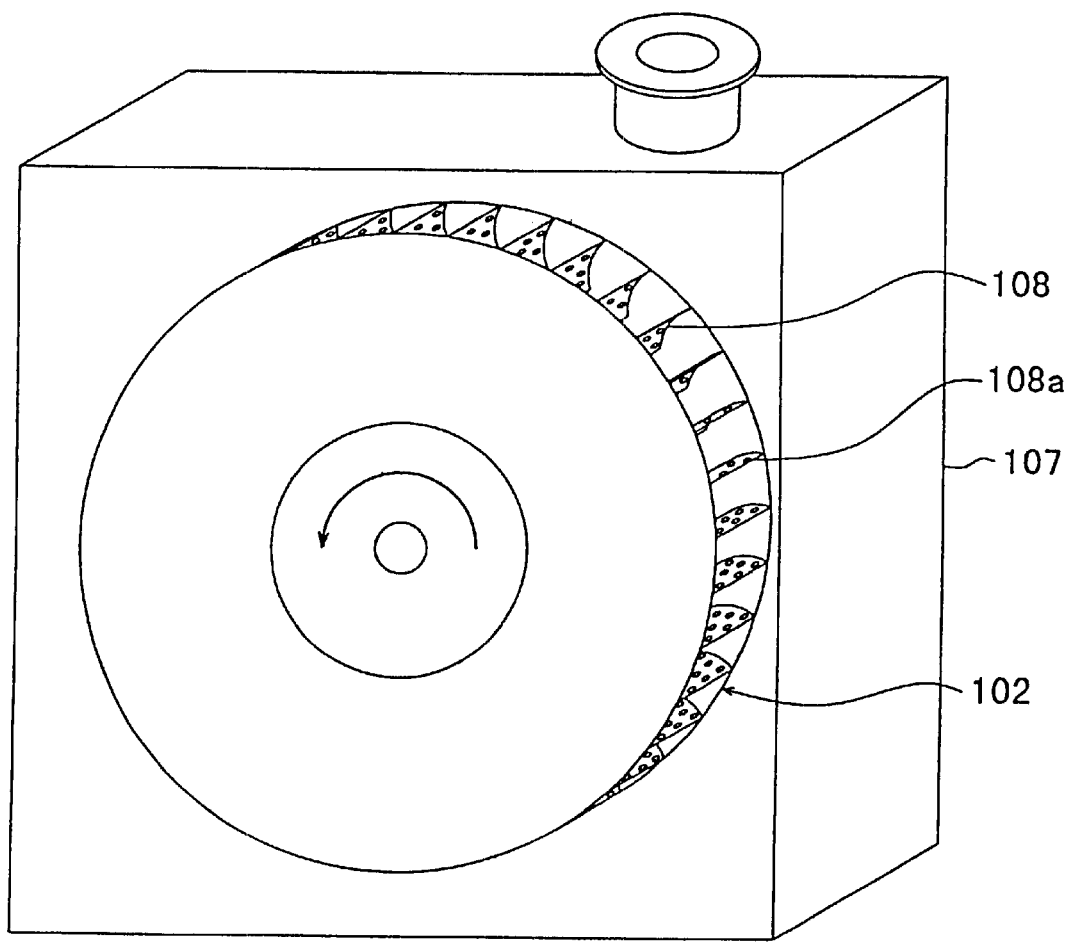
FIG. 10 is a diagram showing a structural example of the fan scrubber used in the waste gas treatment system shown in FIG. 8.

Further, as the impeller 102, an impeller having a multiplicity of minute holes 108*a* in each blade 108, as shown in FIG. 10, may be used. By providing a multiplicity of minute holes 108*a* in each blade 108, air resistance and so forth are reduced, and minute droplets of cleaning water can be emitted from the reverse side of each blade 108 through the minute holes 108*a*. As a result, it becomes possible to rotate the impeller 102 at high speed, reduce the size of cleaning water droplets in the casing 107 and increase the density of cleaning water droplets and hence possible to remove dust and water-soluble hazardous gases from waste gas with high efficiency.

Figure 11:
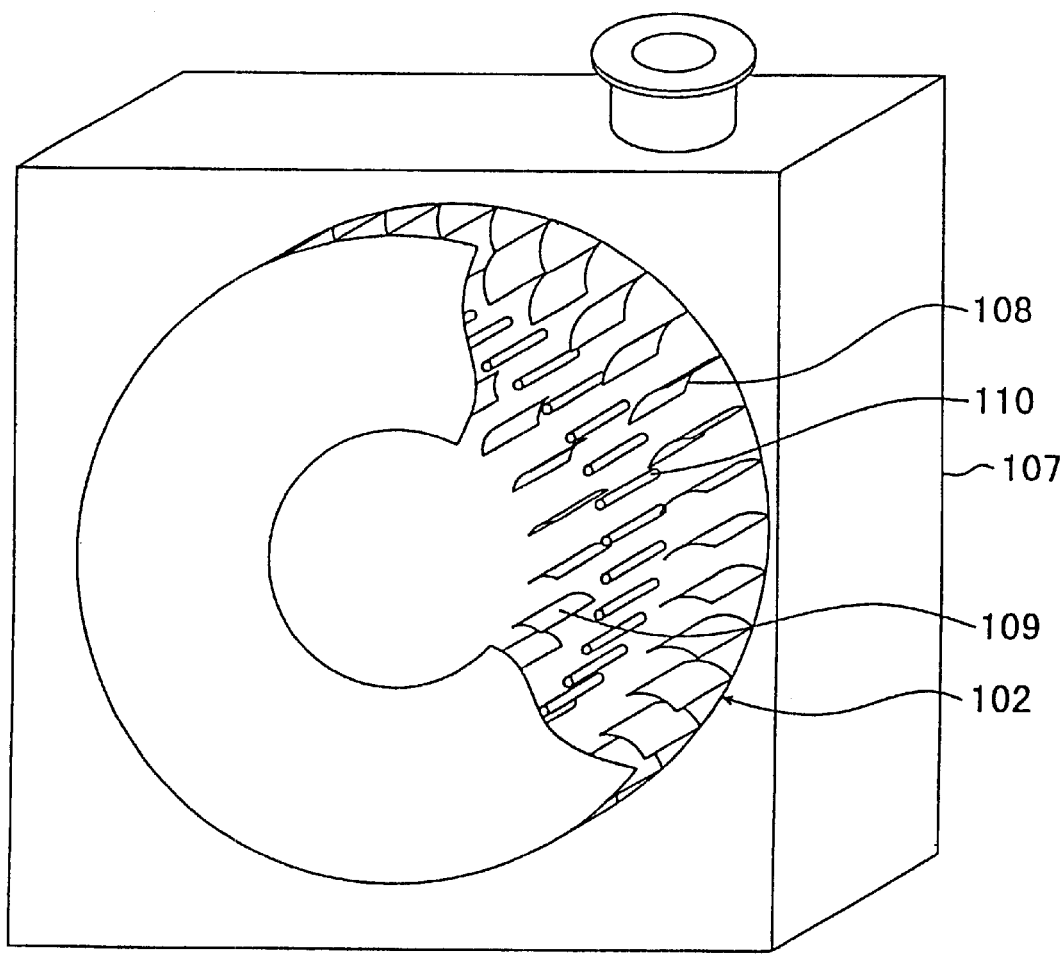
FIG. 11 is a vertical sectional view showing a structural example of the fan scrubber used in the waste gas treatment system shown in FIG. 8.

Further, as the impeller 102, an impeller arranged as shown in FIG. 11 may be used. That is, a multiplicity of blades 108 are installed on the outer peripheral portion, and a multiplicity of short blades 109 and rod-shaped obstacles 110 are discontinuously disposed on the inner peripheral side of the blades 108. By providing the blades 109 and the obstacles 110 on the inner peripheral side of the blades 108 arrayed on the outer peripheral portion as stated above, the flow of waste gas passing through the impeller 102 is made turbulent to promote mixing of the waste gas with cleaning water droplets. Further, minute water droplets are produced when cleaning water blown off from the spray nozzle 103 collides with the blades 108 and 109 and the obstacles 110. Thus, it becomes possible to reduce the size of cleaning water droplets in the casing 107 and to increase the density of cleaning water droplets and hence possible to remove dust and water-soluble hazardous gases from waste gas with high efficiency.

It should be noted that the impeller 102 may be arranged such that a multiplicity of blades 108 are installed on the outer peripheral portion and only a multiplicity of short blades 109 are discontinuously disposed on the inner peripheral side of the blades 108, although illustration of this arrangement is omitted.

Further, the above-described fan scrubber operating method and the impeller structures shown in FIGS. 9 to 11 may be used for the fan scrubber 50 of the waste gas treatment system shown in FIG. 1 and for the impeller of the fan scrubber 50. By doing so, dust and hazardous gases in waste gas can be removed with higher efficiency.

INDUSTRIAL APPLICABILITY

As has been stated above, according to the present invention, a waste gas is subjected to decomposition treatment at high temperature and sprayed with a liquid in a primary cooling section so as to be cooled. The treated waste gas is cooled in a secondary cooling section to reduce the volume of the treated gas, and fine particles contained in the treated gas are aggregated to flocs with large particle diameters. Then, a liquid is injected into the treated gas in a particle collecting section. Therefore, the flocs are captured efficiently. In addition, the volume of the waste gas to be treated is reduced. Accordingly, it is possible to increase the rate of removal of particles from the treated gas and to discharge clean treated gas.

In addition, according to the invention, a U trap is detachably provided in a drain pipe line. Therefore, blockage of the drain pipe line can be prevented. When foreign matter has gathered in the U trap, it is only necessary to detach the U trap from the drain pipe line and to clean the inside of the U trap. Therefore, maintenance is extremely facilitated.

In addition, according to the invention, a water sprinkling means is provided in a waste gas pipe line. Therefore, a flow of water can always be formed on the inner wall surface. Even if a treated gas containing a large amount of dust flows, there is no possibility of dust adhering to the inner wall surface. Even if the waste gas G contains a corrosive gas (e.g., HF gas), the waste gas piping will not be corroded. Further, because water is sprinkled, even if a high-temperature treated waste gas flows in, the high-temperature treated waste gas can be cooled with a minimal amount of water.

In addition, according to the invention, a sprinkling means for intermittently or continuously sprinkling water is provided in the waste gas piping of the secondary cooling section. Therefore, even if the waste gas G contains a corrosive gas, the waste gas piping will not be corroded. Further, because water is sprinkled, even if a high-temperature treated waste gas flows in, the high-temperature treated waste gas can be cooled with a minimal amount of water.

In addition, according to the invention, a mist catcher is provided at the downstream side of the particle collecting section. Therefore, it is possible to prevent mist from flowing out of the system and hence possible to prevent corrosion of piping outside the system and to suppress an increase in pressure loss due to water droplets.

In addition, according to the invention, a liquid used in the waste gas treatment system, exclusive of the primary cooling section, is reused. Therefore, it is possible to reduce the amount of liquid used in the waste gas treatment system.

In addition, according to the invention, mixing of the waste gas and cleaning water droplets in the fan scrubber casing is promoted, so that dust and water-soluble hazardous gases in the waste gas can be removed with high efficiency.

In addition, according to the invention, the waste gas and water droplets in the fan scrubber casing are reduced in size and the density of the water droplets is increased. Accordingly, hydrophobic dust particles in the waste gas that have a particle diameter not larger than 1 $\mu$m and hard-to-dissolve gases can be removed with high efficiency.

In addition, according to the invention, the rotary impeller has a multiplicity of short blades on an outer peripheral portion thereof. Therefore, it is possible to rotate the impeller at high speed without extra resistance and to increase the amount of cleaning water. Consequently, it becomes possible to reduce the size of cleaning water droplets in the casing and to increase the density of the water droplets and hence possible to remove dust and water-soluble hazardous gases from the waste gas with high efficiency.

In addition, according to the invention, the rotary impeller has a multiplicity of minute holes in each blade. Therefore, it is possible to rotate the impeller at high speed without extra resistance and to increase the amount of cleaning water. In addition, minute droplets of cleaning water can be emitted through the minute holes of the blades. Consequently, it becomes possible to reduce the size of cleaning water droplets in the casing and to increase the density of the water droplets and hence possible to remove dust and water-soluble hazardous gases from the waste gas with high efficiency.

The rotary impeller can also have a multiplicity of short blades on an outer peripheral portion thereof and further has a multiplicity of short blades and/or a multiplicity of obstacles on an inner peripheral portion thereof. Therefore, the flow of waste gas passing through the impeller is made turbulent to promote mixing of the waste gas with cleaning water. Further, it is possible to remove dust and water-soluble hazardous gases from the waste gas with high efficiency by minute water droplets produced when cleaning water collides with the multiplicity of short blades and/or the multiplicity of obstacles.

What is claimed is:

1. A waste gas treatment method comprising:
after a waste gas has been subjected to decomposition treatment at high temperature in a decomposition treatment section, spraying the treated gas subjected to the decomposition treatment with a liquid in a primary cooling section to cool the treated gas;

cooling the treated gas in a secondary cooling section with a cooler cooled by a refrigerator to reduce a volume of the treated gas; and collecting fine particles contained in the treated gas in a particle collecting section.

2. A treatment system comprising:

a primary cooling section provided at a stage subsequent to a decomposition treatment section in which a waste gas is subjected to decomposition treatment at high temperature, said primary cooling section having a liquid spray part operable to spray a liquid on the treated gas from the decomposition treatment section;

a secondary cooling section having a cooler cooled by a refrigerator, said secondary cooling section being operable to cool the treated gas sprayed with the liquid in said primary cooling section to reduce a volume of the waste gas; and a particle collecting section operable to inject a liquid into the treated gas cooled in said secondary cooling section to collect fine particles contained in the treated gas.

3. A treatment system according to claim 2, wherein said particle collecting section is a fan scrubber having a rotary impeller.

4. A waste gas treatment method according to claim 1, wherein the particle collecting section comprises a fan scrubber having a casing and a rotary impeller, and said waste gas treatment method further comprises introducing the treated gas containing dust and a water-soluble hazardous gas into the fan scrubber where the dust and water-soluble hazardous gas are adsorbed on cleaning water droplets to purify the waste gas, wherein the rotary impeller is rotated at a high speed and an amount of cleaning water used is maximized to promote mixing of the cleaning water droplets and the treated gas in the casing of fan scrubber, whereby the dust and water-soluble hazardous gas are adsorbed on the cleaning water droplets and thus removed.

5. A waste gas treatment method according to claim 1, wherein the particle collecting section comprises a fan scrubber having a casing and a rotary impeller, and said waste gas treatment method further comprises introducing the treated gas containing hydrophobic dust and a hard-to-dissolve gas into the fan scrubber where the hydrophobic dust and hard-to-dissolve gas are adsorbed on cleaning water droplets and thus removed to purify the waste gas, wherein the rotary impeller is rotated at a high speed and an amount of cleaning water used is maximized to reduce a size of the cleaning water droplets in the casing of the fan scrubber and to increase a density of the cleaning water droplets, thereby increasing a probability that particles of the hydrophobic dust not larger than 1 mm, in which random motion such as Brownian motion is dominant, will plunge directly into the cleaning water droplets, and also increasing an area of contact between the hard-to-dissolve gas and the cleaning water droplets, whereby the hydrophobic dust and hard-to-dissolve gas are removed to purify the waste gas.

6. A waste gas treatment system according to claim 2, wherein the waste gas contains dust and a water-soluble hazardous gas and said particle collecting section comprises a fan scrubber having a rotary impeller with a plurality of short blades located at an outer periphery of said rotary impeller, said fan scrubber being operable to cause the dust and water-soluble hazardous gas to be adsorbed on cleaning water droplets to purify the waste gas.

7. A waste gas treatment system according to claim 2, wherein the waste gas contains dust and a water-soluble hazardous gas and said particle collecting section comprises a fan scrubber having a rotary impeller with a plurality of blades with a plurality of minute holes located therein, said fan scrubber being operable to cause the dust and water-soluble hazardous gas to be adsorbed on cleaning water droplets to purify the waste gas.

8. A waste gas treatment system according to claim 2, wherein the treated gas contains dust and a water-soluble hazardous gas and said particle collecting section comprises a fan scrubber having a rotary impeller with a plurality of short blades located at an outer periphery of said rotary impeller and at least one of an additional plurality of short blades and a plurality of obstacles located at an inner portion of said rotary impeller, said fan scrubber being operable to cause the dust and water-soluble hazardous gas to be adsorbed on cleaning water droplets to purify the waste gas.

9. A waste gas treatment system comprising a decomposition treatment section operable to subject a waste gas to decomposition treatment at high temperature, and a treatment system, said treatment system comprising:

a primary cooling section provided at a stage subsequent to said decomposition treatment section, said primary cooling section having a liquid spray part operable to spray a liquid on the treated gas from said decomposition treatment section;

a secondary cooling section having a cooler cooled by a refrigerator, said secondary cooling section being operable to cool the treated gas sprayed with the liquid in said primary cooling section to reduce a volume of the treated gas;

a particle collecting section operable to inject a liquid into the treated gas cooled in said secondary cooling section to collect fine particles contained in the treated gas.

10. A waste gas treatment system according to claim 9, wherein said particle collecting section is a fan scrubber having a rotary impeller.

11. A waste gas treatment system according to claim 9, further comprising a U trap detachably provided in a drain pipe line for draining water containing foreign matter from said primary cooling section, said U trap being operable to collect the foreign matter.

12. A waste gas treatment system according to claim 9, further comprising sprinkling means for sprinkling water provided in a waste gas pipe line through which the treated gas from said decomposition treatment section flows.

13. A waste gas treatment system according to claim 11, further comprising sprinkling means for sprinkling water provided in a waste gas pipe line through which the treated gas from said decomposition treatment section flows.

14. A waste gas treatment system according to claim 9, further comprising sprinkling means for intermittently or continuously sprinkling water provided in waste gas piping of said secondary cooling section.

15. A waste gas treatment system according to claim 11, further comprising sprinkling means for intermittently or continuously sprinkling water provided in waste gas piping of said secondary cooling section.

16. A waste gas treatment system according to claim 12, further comprising sprinkling means for intermittently or continuously sprinkling water provided in waste gas piping of said secondary cooling section.

17. A waste gas treatment system according to claim 9, further comprising a mist catcher provided in a waste gas pipe line through which the treated gas from said particle collecting section flows, said mist catcher being operable to catch mist contained in the treated gas.

18. A waste gas treatment system according to claim 11, further comprising a mist catcher provided in a waste gas pipe line through which the treated gas from said particle collecting section flows, said mist catcher being operable to catch mist contained in the treated gas.

19. A waste gas treatment system according to claim 12, further comprising a mist catcher provided in a waste gas pipe line through which the treated gas from said particle collecting section flows, said mist catcher being operable to catch mist contained in the treated gas.

20. A waste gas treatment system according to claim 14, further comprising a mist catcher provided in a waste gas pipe line through which the treated gas from said particle collecting section flows, said mist catcher being operable to catch mist contained in the treated gas.

21. A waste gas treatment system according to claim 9, wherein the liquid used in said waste gas treatment system, exclusive of said primary cooling section, is reused.

22. A waste gas treatment system according to claim 11, wherein the liquid used in said waste gas treatment system, exclusive of said primary cooling section, is reused.

23. A waste gas treatment system according to claim 12, wherein the liquid used in said waste gas treatment system, exclusive of said primary cooling section, is reused.

24. A waste gas treatment system according to claim 14, wherein the liquid used in said waste gas treatment system, exclusive of said primary cooling section, is reused.

25. A waste gas treatment system according to claim 17, wherein the liquid used in said waste gas treatment system, exclusive of said primary cooling section, is reused.

26. A waste gas treatment method according to claim 4, wherein the rotary impeller is rotated at not less than 55 m/s in peripheral velocity.

27. A waste gas treatment method according to claim 5, wherein the rotary impeller is rotated at not less than 55 m/s in peripheral velocity.

28. A waste gas treatment system according to claim 11, wherein the foreign matter is fine particles and said U trap is operable to collect the fine particles.

* * * * *

UNITED STATES PATENT AND TRADEMARK OFFICE
CERTIFICATE OF CORRECTION

PATENT NO. : 6,638,343 B1
DATED : October 28, 2003
INVENTOR(S) : Kohtaro Kawamura et al.

It is certified that error appears in the above-identified patent and that said Letters Patent is hereby corrected as shown below:

Title page,
Item [54], Title, please change to -- WASTE GAS TREATMENT SYSTEM --.

Column 13,
Lines 51 and 52, replace "not larger than 1mm," with -- not larger than 1$\mu$m, --.

Signed and Sealed this

Fourth Day of May, 2004

JON W. DUDAS
*Acting Director of the United States Patent and Trademark Office*